Nov. 2, 1937.  R. P. LEWIS  2,097,627
VIBRATION DAMPENER
Filed July 26, 1933  3 Sheets—Sheet 1
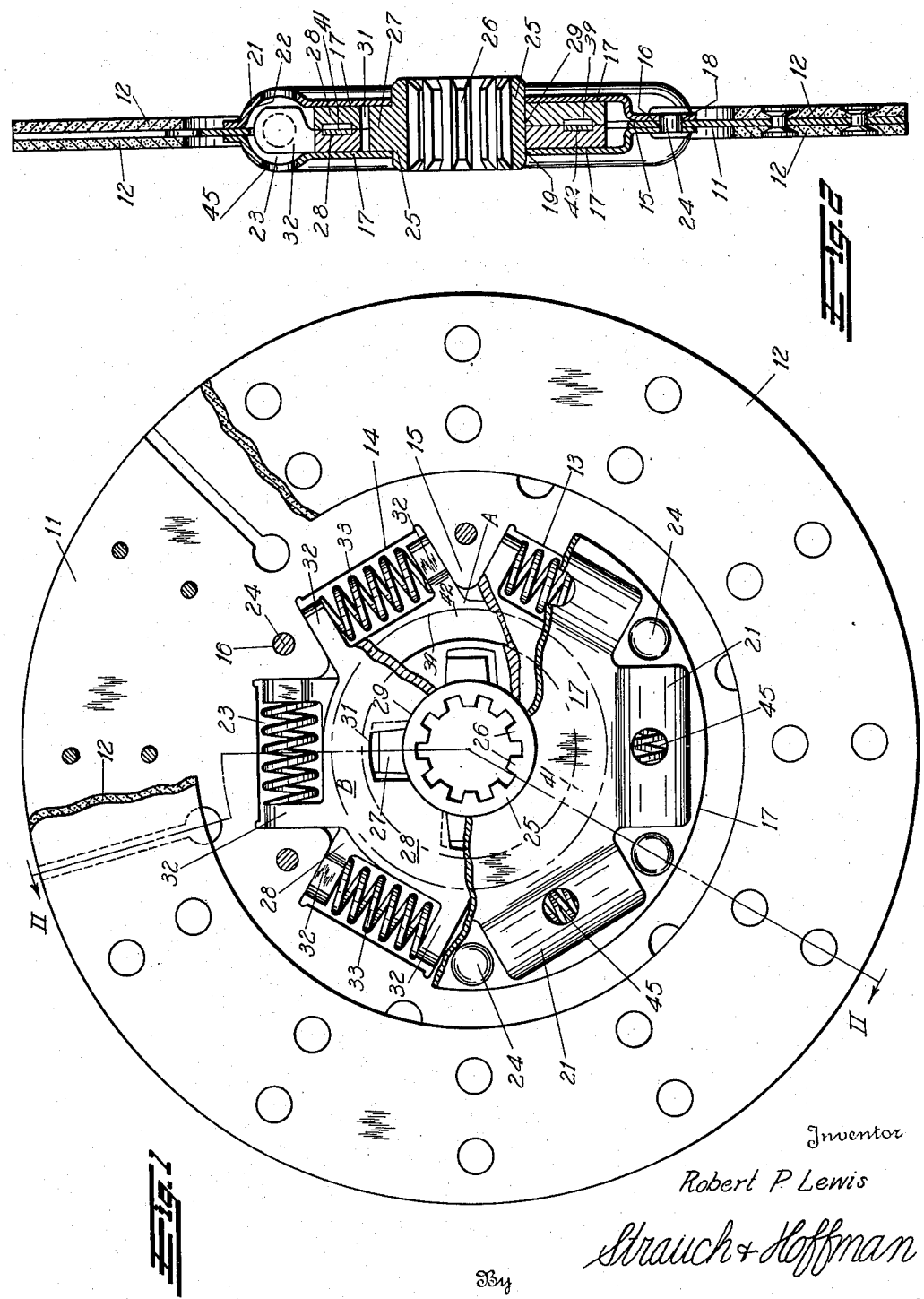

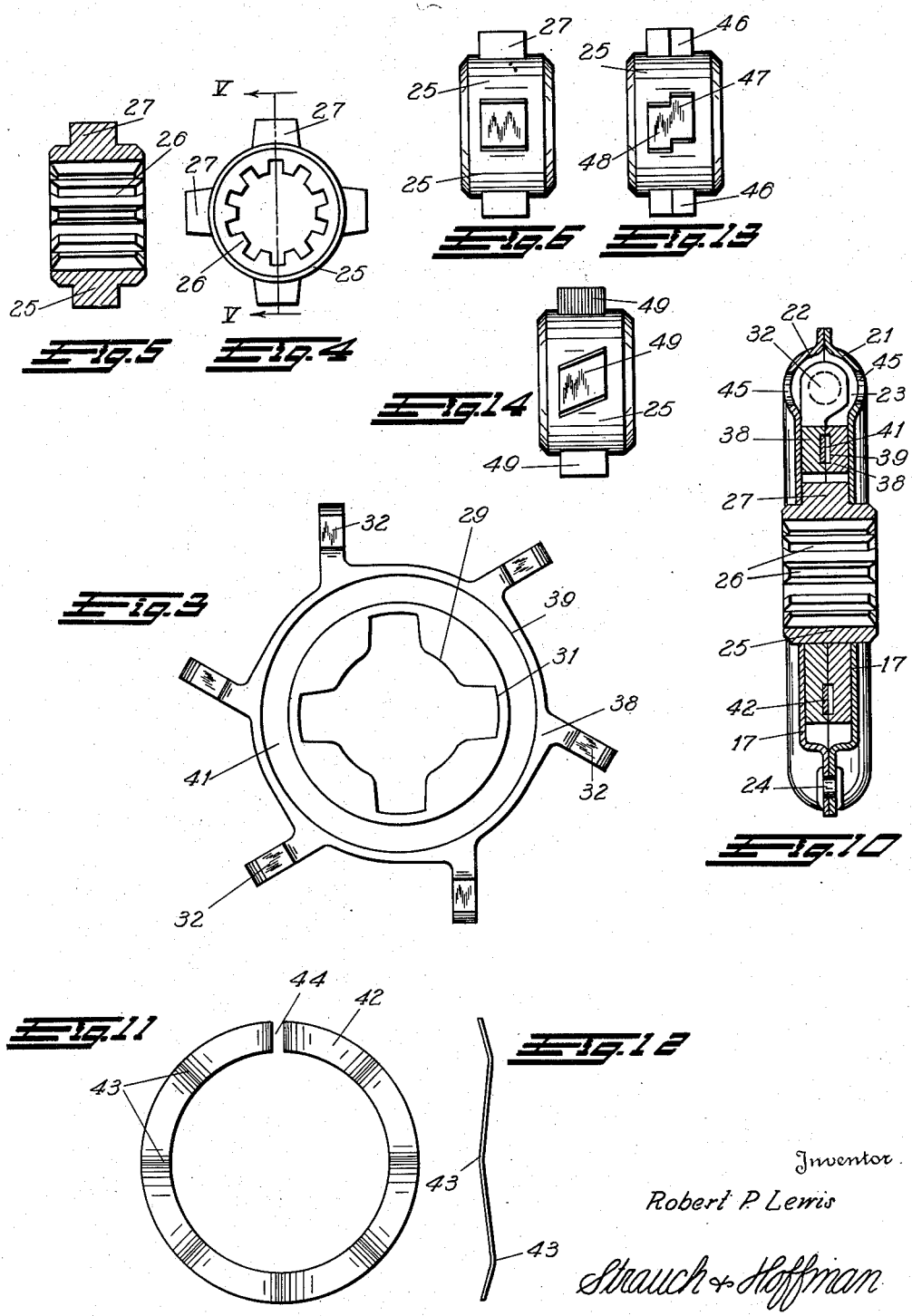

Nov. 2, 1937.  R. P. LEWIS  2,097,627
VIBRATION DAMPENER
Filed July 26, 1933  3 Sheets-Sheet 3
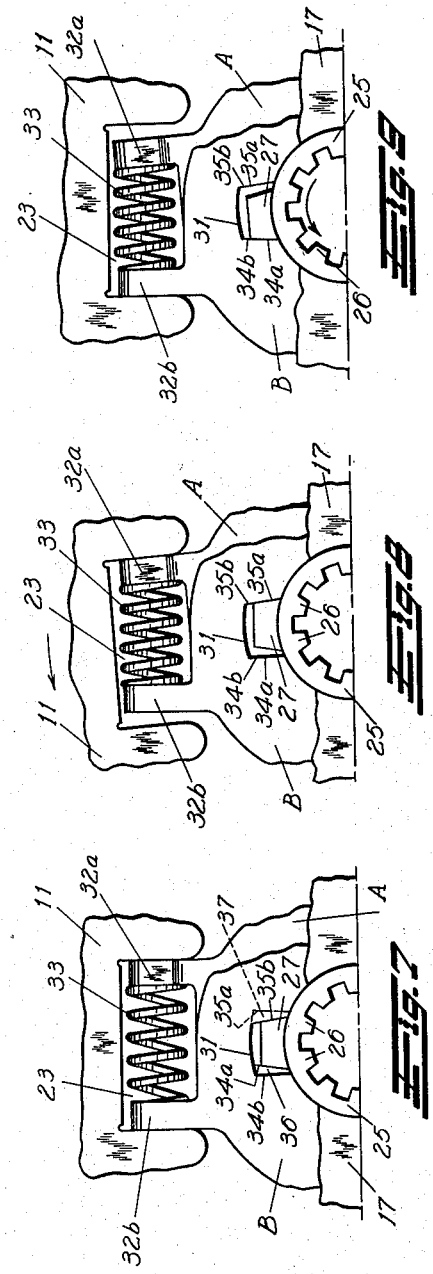

Patented Nov. 2, 1937

2,097,627

UNITED STATES PATENT OFFICE 2,097,627

VIBRATION DAMPENER

Robert P. Lewis, Toledo, Ohio, assignor to Spicer Manufacturing Corporation, Toledo, Ohio, a corporation of Virginia Application July 26, 1933, Serial No. 682,331

19 Claims. (Cl. 192—68)

This invention relates to shock absorbing and vibration dampening mechanisms of the type generally employed in power transmission elements and more particularly to shock absorbing and vibration dampening devices employed in motor vehicles.

While the invention as described herein is susceptible of many uses such as in shaft or rod couplings, universal joints, and the like, its embodiment in the clutch of a motor vehicle will be described in detail for the purposes of illustration.

In present-type clutches as employed in motor vehicles, the flywheel of the motor is ordinarily used as a driving member to transmit power to the transmission and differential of the vehicle, a suitable friction surface being formed on the flywheel. A transmitting element connected to a suitable shaft is arranged to be shifted into and out of engagement with the surface of the flywheel as desired and receive power therefrom. In the usual type of manually operated clutch, the transmitting element consists of a disc having a ring of friction material thereon which is forced into driving engagement with the friction surface on the flywheel by a spring-actuated presser plate controlled by the operator of the vehicle. In automatic clutches of more recent development, the transmitting element likewise engages the flywheel but is forced into engagement therewith by another plate having a friction element thereon and actuated by suitable automatic means controlled by the speed of the motor or other factor.

In all types of clutches, manual or automatic, like conditions must be met as regards the conditions under which power must be transmitted and the shocks and jars to which they are made subject. Accordingly, such clutches must be of strong and rugged construction in order to operate properly over extended periods of time without biting or slipping. Such construction demands relatively large amounts of material and as a consequence the clutch is characterized by considerable inertia which, by reason of the constant acceleration and deceleration of the motor vehicle, gives rise to severe shocks and chattering with accompanying wear and tear on the clutch and the development of vibrations and noises audible and annoying to the occupants of the vehicle. Repair of the clutch is then necessary and, since the clutch is usually so mounted that it must be entirely dismantled for proper repair, considerable expense is involved.

The motors of some motor vehicles are characterized by the creation in the crank shaft of a periodic vibration which occurs at or around one or more particular speeds of the motor and is due to one or more of the explosions in the cylinders synchronizing in point of time with the natural period of vibration of the crank shaft. This vibration is transmitted not only to the supporting elements of the motor, but also to the clutch and its associated elements, such as the gear box, and may result in an annoying periodic chatter in the transmission. This chatter is not only annoying from an audible standpoint, but produces an undesirable effect on the mechanism, since it subjects it to a succession of varying periodic strains during operation.

The above disadvantages with their attendant ill effects have been overcome by the present invention, which has as an object the provision of a shock absorbing and vibration dampening mechanism, particularly adapted for devices involving torque transmission elements such as clutches, which is possessed of sufficient inherent flexibility to dampen or absorb vibrations and noises proceeding from the motor of a motor vehicle and prevent transmission thereof to other portions of the mechanism where such vibrations and noises would be objectionable to the ear and detrimental to the mechanism.

A further object is the provision of an improved vibration dampening mechanism in a proved vibration dampening mechanism in a torque transmission element such as a clutch plate characterized by a sufficient amount of inherent torsional flexibility to absorb vibrations received from a driving member such as the flywheel of a motor in connection with the reception of power therefrom and deliver the power in undiminished quantity but with the vibrations formerly associated therewith removed to the adjacent power transmitting elements.

Still a further object of this invention is to provide an improved shock absorbing mechanism for use in a power transmission element such as a clutch of a motor vehicle which will iron out or cushion any shocks or jolts arising from sudden changes in angular velocity of the power transmission elements as happens when a motor vehicle is accelerating or decelerating with an accompanying alternation of the motor driving the vehicle and the vehicle driving the motor.

A further object of this invention is to provide an improved shock absorbing mechanism in combination with a clutch element which will absorb torque shocks and relieve the associated mechanism such as the transmission, differential and universals from jolts, jars and shocks which would induce excessive wear.

A further object of this invention is the provision of an improved vibration dampening means in combination with a clutch element which automatically dampens out vibrations and irregularities in rotation and tends to produce smooth and uniform rotation of its associated elements, particularly during changes in the rate of rotation.

It is a still further object to provide an improved shock absorbing mechanism in combination with a clutch element for a motor vehicle which will cushion the shock usually attendant upon the engagement of clutch members and establish a smooth, steady transmission of torque to the driving mechanism.

A further object of this invention is to provide a shock absorbing and vibration dampening mechanism having retaining means for cushioning elements such as springs contained therein, the retaining means serving to retain the springs if broken and prevent them from getting into and damaging the associated mechanism while permitting full freedom of movement with no restriction.

A further object of this invention is the provision of a shock absorbing and vibration dampening mechanism containing relatively movable means to create a cushioning effect, separate means being employed which may be varied in effect to increase or decrease the cushioning action to any desired degree to meet varying conditions.

Still a further object is to provide a shock absorbing and vibration dampening mechanism to absorb vibrations and shocks which mechanism comprises a plurality of relatively movable means creating a cushioning effect, selective friction means being interposed between said means to retard relative movement thereof and increase or decrease the effective cushioning action.

A further object of this invention is to provide a shock absorbing and vibration dampening mechanism comprising a plurality of opposing relatively movable members which are identical in construction, thereby effecting economies in the manufacture of the clutch elements.

Still a further object of this invention is to provide a clutch embodying both vibration dampening means and positive drive means, the former being entirely enclosed and protected and designed to operate prior to the positive drive means.

A futher object of this invention is to provide a clutch plate embodying vibration dampening means, the plate being characterized by a friction element support of relatively light construction through which the driving force is equally distributed by means engaging the vibration dampening means, thereby avoiding the concentration of a force of marked magnitude on the support and preventing the possibility of distortion or misalignment.

A further object of this invention is the provision of a clutch plate containing resilient elements adapted to absorb vibrations in all directions of drive through the clutch, the elements being completely enclosed and protected from the associated mechanism.

Other objects, not specifically enumerated above, will become apparent as the description of the present invention proceeds in connection with the accompanying drawings, wherein:

Figure 1 is an elevation of the shock absorbing and vibration dampening mechanism of this invention as embodied in a clutch plate, portions thereof being broken away to show more clearly the internal construction;

Figure 2 is a section of the clutch plate of Figure 1 taken on the line II—II of Figure 1;

Figure 3 is an elevation of a lug plate that may be employed in connection with the vibration dampener of Figures 1 or 10;

Figure 4 is a front elevation of a hub member comprising a portion of the drive shown in Figure 1;

Figure 5 is a section of the hub member of Figure 4 taken on the line V—V of Figure 4;

Figure 6 is a side elevation of the hub member of Figure 4;

Figure 7 is an elevation of the internal mechanism of the clutch plate of Figure 1 showing the position of the elements when power is not being transmitted;

Figure 8 is a view similar to Figure 7 but showing the position of the elements as power is being transmitted in one direction;

Figure 9 is a view similar to Figures 7 and 8, but showing the position of the elements as power is being transmitted in a direction opposite to that shown in Figure 8;

Figure 10 is a section taken similar to that of Figure 2 of another preferred embodiment of the shock absorbing and vibration dampening mechanism of this invention wherein friction means is employed to retard the relative movement of the lug plates and a disc of the type shown in Figure 1 is not employed;

Figure 11 is a front elevation of a preferred form of friction means employed with the modification of Figure 10;

Figure 12 is a side elevation of the friction means of Figure 11 as it appears in position in the modification shown in Figure 10;

Figure 13 is a side elevation of a second preferred embodiment of the hub member of this invention wherein respective portions of the lugs are offset from one another; and Figure 14 is a side elevation of a further preferred embodiment of the hub member of this invention wherein the lugs are formed with diagonal surfaces.

With reference to the drawings wherein like numerals are used to denote corresponding parts and particularly to Figure 1 wherein the shock absorbing and vibration dampening mechanism of this invention has been shown as embodied in a clutch plate or similar device, 11 is a force transmitting element such as a clutch disc upon whose periphery is secured layers 12 of friction material in the usual manner of clutch plate constructions, layers 12 being suitably secured to disc 11 by rivets or other suitable fastening means.

Disc 11 is formed with an opening 13, the border of which is defined by a series of rectangular notches 14 and a series of V-shaped projections 15 which are preferably symmetrically disposed with respect to the axis of disc 11.

An aperture 16 is provided in each projection 15 which serves as a portion of a fastening means to be later described.

Enclosing openings 13 and symmetrically located with respect thereto is a series of cover plates 17, one plate 17 being mounted on each side of disc 11. Each plate 17 has a series of apertures 18 formed adjacent its outer peripheral edge to correspond with apertures 16 in disc 11, and an aperture 19 at its center. Plates 17 are further formed with a series of annularly spaced protuberances 21, arcuate in cross section as shown in Figure 2, and positioned between each pair of apertures 18. Protuberances 21 define recesses 22 on the inner face of the plate. When plates 17 are placed on disc 11 with apertures 18 registering with apertures 16, recesses 22 of the opposing plates cooperate to form chambers 23 which are closed with the exception of the portions thereof facing the center of plates 17. Plates 17 are preferably secured to disc 11 by rivets or bolts 24 passing through aligned apertures 16 and 18.

A hub member 25 is provided within central apertures 19 of plates 17 and is preferably dimensioned to rotate relative to plates 17 while serving as a support therefor. Hub 25 is of sufficient width to project for some distance beyond the engaged portions of plates 17 and is preferably formed with splines 26 or the like on its interior to permit a driving connection to a shaft. A series of radially extending projections or lugs 27 are formed on the periphery of hub 25 at regularly spaced intervals. Lugs 27 may be formed integral with hub 25 or may be welded, bolted or otherwise suitably secured thereto.

It will be noted from Figure 2, that plates 17 contact with disc 11 only at their outer extremities and at all other portions are so formed as to define a space between one another which is slightly more than the width of lugs 27 to permit relative movement therebetween. Within this space, a series of lug plates 28 are mounted. Lug plates 28 are formed with apertures 29 at their centers of a size to conform to, yet rotate relatively to hub 25. A series of radially extending notches 31 are formed in the periphery of apertures 29 and are of a width slightly greater than the width of lugs 27.

A series of lugs 32 are formed on the outer periphery of lug plates 28, and preferably project at an angle to the radii of the lug plates as shown. The width of lugs 32 is not co-extensive with that of lug plates 28. Lugs 32 are of greater width, the difference in width being provided on only one side of lugs 32 to form them with an offset portion which serves a purpose to be later described. The grooves 39 and the friction ring 42 are more specifically described hereinafter in connection with Figures 3 and 10.

In assembling the shock absorbing and vibration dampening mechanism of this invention, a pair of lug plates 28 are placed within the space defined by the adjacent cover plates 17. While lug plates 28 are substantially identical, one is reversed in the assembly so that lugs 32 of the plates will be offset toward one another and will fall in circumferential alignment as shown in Figure 2. One lug 32 of each plate is positioned within each chamber 23, the lugs of opposing plates being located in opposite ends of the chambers and in alignment with one another. Between the lugs of each chamber, springs 33 or like resilient members are positioned which tend to maintain the lugs of opposing lug plates in spaced relation. It will be noted that when lug plates 28 are assembled as described, and lugs 32 are spaced apart as far as possible, notches 31 of the opposing lug plates are not in alignment with one another, but are slightly offset. This offset is due to the relative positioning of lugs 32 with respect to notches 31. Thus as shown in Figure 1, lug 27 of hub 25 has one side of notch 31 of one lug plate bearing against it and the opposite side of the notch 31 of the other lug plate bearing against it, the position of the lug plates being maintained by springs 33 acting against lugs 32. The end walls of chambers 23 provide the force reacting to the force of springs 33.

Referring to the modus operandi of this invention, it will be noted from Figure 1 that the general assembly includes lug plates 28 mounted for limited rotary movement on hub 25 and for relative movement between themselves, and cover plates 17 mounted for rotary movement on hub 25 and defining chambers 23 containing springs 33 and lugs 32, cover plates 17 being rigidly secured to disc 11 and maintaining the entire assembly in position.

Envisioning the movements of one lug 27 in its associated notches 31 of lug plates 28 as shown in detail in Figures 7 to 9, inclusive, in a position wherein no power is being transmitted by the mechanism, the elements are as shown in Figure 7 wherein the opposing lug plates 32 have been generally designated as A and B. Lugs 32a and 32b are spaced apart to the point where both bear against the end walls of chamber 23 and the adjacent portions of disc 11. The left side of lug 27 contacts with the left wall 34a of notch 31 of plate A leaving a clearance space between the right side of the lug 27 and the right wall 35a, the clearance being designated at 37. The right side of lug 27 contacts with wall 35b of notch 31 of plate B and the left side of lug 27 is spaced from the left wall 34b by a clearance space 36, as shown. Hub 25 is thus held in position by the contact of walls 35b and 34a and vibration thereof prevented.

In Figure 8, it has been assumed that the motor of the vehicle is driving the wheels in which case disc 11 is the driving element and rotates in a counterclockwise direction, as shown by the arrow, hub 25 acting to oppose the movement. Power will be transmitted first through the end wall of disc 11 and of chamber 23 engaging lug 32a. Since lug 32b is held in position by contact of surface 35b against the right side of lug 27, lug 32a will operate to compress spring 33, lug 32b then leaving its associated chamber wall as shown. Power to the hub is transmitted through surface 35b. The compression of spring 33 at this point provides a cushioning action which prevents a sudden application of power as would jolt and shock the associated mechanism. On the continued application of power, wall 35a of plate A moves to contact with lug 27, and the notches 31 of plates A and B coincide. At this point, a positive drive is established through lug 32a and surface 35a of plate A to lug 27 of hub 25, spring 33 operating to cushion and absorb the shocks occasioned by changes in the rate of rotation of the elements.

In Figure 9, the position of the elements when the vehicle is coasting is illustrated. In such a case, hub 25 is the driving member moving in a counterclockwise direction as designated by the arrow, and disc 11 is the reacting member. As lug 27 of hub 25 moves to the left, it carries surface 34a of plate A with it, forcing lug 32a to compress spring 33 against the reaction of lug 32b and the adjacent wall of chamber 23 and disc 11. This results in a cushioning action which eliminates any jolting and shocking accompanying the initiation of the power transmission. As the power increases, lug 27 moves surface 34a to a point where the lug is halted in its relative movement by surface 34b of plate B, notches 31 in plates A and B then coming into alignment. At this stage of operation, a positive drive is established from hub 25 to disc 11 through the left side of lug 27, surface 34b and lug 32b.

While the operation of only one lug and notch assembly has been described, it is to be understood that all the assemblies operate in like manner and further description thereof is deemed unnecessary.

The spacing of opposed lug plates 28 in the embodiment illustrated, in Figures 1 and 2, is such that little or no friction is present therebetween which would assist in retarding their relative movement and increasing the cushioning action other than that normally created by the rubbing together of the adjacent surfaces of the lug plates and the cover plates.

If it is desired to increase the friction between the opposing lug plates to retard relative movement therebetween and assist springs 33 in their cushioning action, a shock absorbing and vibration dampening mechanism as disclosed in Figure 10 may be used. The construction in Figure 10 is substantially the same as that of Figure 1 with the exception that a friction disc member is not shown in connection with the construction in Figure 1. When lug plates 38 are assembled in opposed relation as shown in Figure 10, with the lugs thereof aligning with one another, annular grooves 39 define a recess 41. A circular spring member 42 or friction ring, shown in detail in Figures 11 and 12 is inserted in recess 41. By reason of the zig-zag cross section of ring 42 formed by the provision of a series of humps 43 therein, as shown in Figure 12, ring 42 operates to frictionally engage lug plates 38 under relatively high pressure and retard relative movement therebetween thus increasing the cushioning action of the unit. Not only is the retarding of relative motion between the lug plates increased, but, since ring 42 forces the lug plates against cover plates 17, the friction therebetween is increased. Ring 42 is formed with a cut-out portion 44 to permit of its expansion when compressed between the lug plates. Obviously, it may be of any desired resiliency to suit the conditions to which the unit is to be subjected. Not only does ring 42 increase the friction between the lug plates and the cover plates, but also maintains the former tightly against the cover plates whereby vibration of the elements is avoided.

The provision of a separate means, such as ring 42, to increase the friction between the plates possesses the advantage that the wear due to friction is concentrated on the ring surfaces which may readily be replaced instead of being spread over the surface of the lug plates, thus avoiding a possible replacement of the entire lug plates.

If desired, ventilating holes 45 may be formed in the cover plates to permit of the dissipation of heat throughout the unit created by the almost continuous motion of the elements.

Since the shock absorbing and vibration dampening mechanism of this invention is not confined to clutch assemblies, as illustrated in Figures 1 and 2, the modification of Figure 10 is shown as adapted for any use where shock absorbing and vibration dampening mechanism is desirable, as in shaft couplings, universal joints and the like. For instance, the embodiment of Figure 10 may be readily employed as a shaft or rod coupling by securing one shaft or rod or similar force transmitting element to the hub by suitable fastening means and securing the other shaft or rod to cover plates 17, either by a yoke coupling or other suitable arrangement. In such an arrangement where no disc 11 is provided, the end walls of the recessed portions in the cover plates 17 may receive the reaction of the lugs, or a disc of substantially the same diameter as that of the cover plate 17 may be provided with suitable recesses therein as for instance are provided in the disc 11.

In Figure 13, a second preferred manner of forming the hub of this invention is illustrated. The hub shown is the same as the hub of Figure 6, except that lugs 27 are supplanted by lugs 46 which comprise offset portions 47 and 48. The hub of Figure 14 likewise resembles the hub of Figure 6, except for lugs 27 which are supplanted by lugs 49 having diagonal faces as shown. When lugs of the type of Figures 13 and 14 are employed, the relative positions of notches 31 in apertures 29 of lug plates 28 must be slightly changed with respect to lugs 32 by reason of the different shapes of lugs 46 and 49. In operation, notches 31 of plates 28 will be aligned when no power is being transmitted and will be offset when power is transmitted contrary to the positions shown in Figures 7 to 9, inclusive.

From the foregoing description of the shock absorbing and vibration dampening mechanism of this invention, it is apparent that it is possessed of a number of advantages. For instance, it has been found particularly adaptable for use in couplings of different kinds when associated with a torque transmission system characterized by numerous variations in angular velocity, as are present in the drive mechanism of a motor vehicle. When embodied, for example, in a universal or clutch mechanism connecting the motor of a motor vehicle to the differential mechanism, vibrations and noises emanating from the motor are removed while the power is transmitted undiminished, thus preventing unnecessary wear and tear upon the transmission, differential and associated elements and eliminating the possibility of noises and vibrations that would annoy the occupants of the vehicle.

The shock absorbing and vibration dampening mechanism is self-contained and all moving parts therein are enclosed and protected from the associated mechanism. This enclosure also ensures against the possibility of broken elements of the mechanism getting into the associated mechanism and causing injury thereto. The feature of being able to vary the friction between the elements to vary the reaction of the mechanism when transmitting torque is distinctly of great value since it permits the mechanism to be simply adjusted to meet varying conditions. Thus, the same mechanism may be used under different conditions by only changing the friction ring.

The utilization of common springs for all directions of drive is of distinct advantage, since a maximum of cushioning action is provided for all reactions with a minimum number of spring elements.

In the foregoing description and in the following claims where the word "driven" is applied to one element as distinguishing it from another element termed "driving", it is to be understood that this use of the term is solely for the purpose of description and is not to be considered as limiting since in a direction of torque transmission opposite to that assumed, the "driving" element would become the "driven" element and the "driven" element would become the "driving" element.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed and desired to be secured by United States Letters Patent is:

1. A shock absorbing and vibration dampening mechanism comprising a force transmitting element; a hub; a plurality of members mounted for movement relative to each other and to said hub; friction means to retard relative movement between said members; and cover plates mounted on said hub and enclosing said members, said cover plates being secured to said element.

2. In a shock absorbing and vibration dampening mechanism, a unitary hub member having spaced lugs extending outwardly from the periphery thereof, said lugs comprising adjacent portions disposed axially of said hub member and offset with respect to one another.

3. A shock absorbing and vibration dampening mechanism comprising a force transmitting element; members mounted for movement relative to each other and to said element; lugs on said members, the lugs of each member being arranged to form complemental pairs with the lugs of an adjacent member; and springs mounted between said complemental pairs of lugs, said element being provided with recesses to receive said springs and associated lugs.

4. A shock absorbing and vibration dampening mechanism comprising a force transmitting element; members mounted for movement relative to each other and to said element, friction means between said members to retard relative motion therebetween; lugs on said members, the lugs of each member being arranged to form complemental pairs with the lugs of an adjacent member; and springs mounted between said complemental pairs of lugs, said element being provided with recesses to receive said springs and associated lugs.

5. A shock absorbing and vibration dampening mechanism comprising a force transmitting element and a hub; members mounted on said hub for movement relative to each other and to said hub; lugs on said members, the lugs of each member being arranged to form complemental pairs with the lugs of an adjacent member; and springs mounted between said complemental pairs of lugs, said element being provided with recesses to receive said springs and associated lugs.

6. A shock absorbing and vibration dampening mechanism comprising a force transmitting element and a hub; members mounted on said hub for movement relative to each other and to said hub; friction means between said members to retard relative motion therebetween; lugs on said members, the lugs of each member being arranged to form complemental pairs with the lugs of an adjacent member; and springs mounted between said complemental pairs of lugs, said element being provided with recesses to receive said springs and associated lugs.

7. A vibration dampening and shock absorbing mechanism comprising a force transmitting element and a hub; lugs on said hub, members mounted on said hub for movement relative to each other and provided with recesses to receive said hub lugs; lugs on said members, the lugs of each member being arranged to form complemental pairs with the lugs of an adjacent member; and springs mounted between said complemental pairs of lugs, said element being provided with recesses to receive said springs and associated lugs.

8. A shock absorbing and vibration dampening mechanism comprising a force transmitting element and a hub; lugs on said hub; plates mounted on said hub for movement relative to each other and provided with recesses to receive said hub lugs; lugs on said plates, the lugs of each plate being arranged to form complemental pairs with the lugs of an adjacent plate; and springs mounted between said complemental pairs of lugs arranged to maintain said plate recesses in offset relation when fully distended, said element being provided with recesses to receive said springs and associated lugs.

9. A shock absorbing and vibration dampening mechanism comprising a force transmitting element and a hub; plates mounted on said hub for movement relative to each other and to said hub; lugs on each of said plates extending from the outer periphery thereof and offset from the plane of said plates, the lugs of adjacent plates being aligned with one another in complemental pairs; and springs positioned between said complemental pairs of lugs, said element being provided with recesses to receive said springs and associated lugs.

10. A shock absorbing and vibration dampening mechanism comprising a force transmitting element and a hub; lugs on said hub; plates mounted on said hub for movement relative to each other and provided with recesses to receive said hub lugs; friction means between said plates to retard relative motion therebetween; lugs on said plates; the lugs of each plate being arranged to form complemental pairs with the lugs of an adjacent plate; and springs mounted between said complemental pairs of lugs arranged to maintain said plate recesses in offset relation when fully distended, said element being provided with recesses to receive said springs and associated lugs.

11. A shock absorbing and vibration dampening mechanism comprising substantially identical plates having apertures at approximately the centers thereof, lugs on said plates and recesses internally of said apertures, said recesses being arranged to be offset to one another when said plates are placed in reversed adjacent relation with the lugs forming complemental pairs.

12. A shock absorbing and vibration dampening mechanism comprising a series of movable plates arranged to rotate relative to one another about the same axis and containing grooves arranged to align with one another and lugs thereon arranged to complement one another when said plates are placed in adjacent relation; resilient means positioned between said complemental lugs; and an expansible ring positioned within said grooves to retard relative movement of said plates.

13. In a clutch plate, a hub; radially extending lugs secured to said hub; a plurality of plates mounted for limited relative movement on said hub, the inner periphery of said plates being provided with recesses to receive said hub lugs; a friction element mounted between said plates to retard relative movement thereof; lugs extending outwardly and axially from the outer periphery of said plates, the lugs of adjacent plates being arranged in complemental pairs and facing one another in a plane perpendicular to the axis of the hub; springs positioned between said pairs of lugs arranged to maintain said plate recesses in offset relation when fully distended; a friction disk surrounding the periphery of said plates and provided with recesses to receive said pairs of lugs; cover plates mounted on said hub for movement relative thereto and enclosing said lug plates, said cover plates being formed with recesses to enclose said springs and associated lugs, and means to secure said cover plates to said friction disk.

14. In combination with a shock absorbing and vibration dampening mechanism, a unitary hub member having spaced lugs extending outwardly from the periphery thereof, said lugs having side surfaces formed in planes extending at an acute angle to the axis of said hub.

15. A shock absorbing and vibration dampening mechanism comprising a hub; outwardly extending lugs on said hub; a plurality of plates mounted for limited relative movement on said hub, the inner periphery of said plates being provided with recesses to receive said hub lugs; lugs extending outwardly and axially from the outer periphery of said plates, the lugs of adjacent plates being arranged in complemental pairs and facing one another in a plane substantially perpendicular to the axis of the hub; springs positioned between said pairs of lugs arranged to maintain said plate recesses in offset relation when fully distended; and cover plates mounted on said hub for movement relative thereto and enclosing said lug plates, said cover plates being formed with recesses to enclose said springs and associated lugs.

16. A shock absorbing and vibration dampening mechanism comprising a hub; a plurality of members mounted on said hub for movement relative to each other and to said hub; lugs on said members, the lugs of each member being arranged to form complemental pairs with the lugs of an adjacent member; springs mounted between said complemental pairs of lugs; and a cover plate freely mounted on said hub and provided with recesses to receive said springs and associated lugs.

17. A shock absorbing and vibration dampening mechanism comprising a force transmitting element; a hub; a plurality of axially adjacent plates mounted for relative movement with respect to both said hub and said element and arranged to transmit power therebetween; and resilient means to engage said plates with said hub and said element.

18. A shock absorbing and vibration dampening mechanism comprising a force transmitting element; a hub; a plurality of axially adjacent plates mounted for movement relative to each other and to said hub and arranged to transmit power between said hub and said element; and resilient means to urge said plates into engagement with said hub and said element.

19. A shock absorbing and vibration dampening mechanism comprising a force transmitting element; a hub; a plurality of axially adjacent plates mounted for relative movement with respect to each other and said element and arranged to transmit power between said hub and said element; and resilient means to urge said plates into engagement with said hub and said element.

ROBERT P. LEWIS.